United States Patent [19]
Kutcher

[11] Patent Number: 6,032,172
[45] Date of Patent: Feb. 29, 2000

[54] DISTRIBUTED COMPUTER PROCESS SCHEDULING MECHANISM

[75] Inventor: Jeffrey M. Kutcher, Spring, Tex.

[73] Assignee: Sun Microsystems, Inc., Palo Alto, Calif.

[21] Appl. No.: 08/865,573

[22] Filed: May 29, 1997

[51] Int. Cl.[7] .................................................... G06F 9/00
[52] U.S. Cl. ........................................ 709/102; 709/100
[58] Field of Search ................................. 395/675, 674, 395/200.52, 670; 709/100, 102, 104, 105, 222; 364/132

[56] References Cited

U.S. PATENT DOCUMENTS

| | | | |
|---|---|---|---|
| 5,325,527 | 6/1994 | Curkoulski et al. | 709/222 |
| 5,414,845 | 5/1995 | Behm | 709/104 |
| 5,519,867 | 5/1996 | Moeller | 709/107 |
| 5,644,486 | 7/1997 | Chang | 700/3 |

OTHER PUBLICATIONS

Buford, John "Delivery . . . Network" ACM Multimedia 97 Washington usa, p. 75–.

"Jara Essentials for c and C++ programmers", Barry Boone, 1996.

"cron," *FreeBSD General Commands Manual*, FreeBSD 2.2–Stable (on–line UNIX documentation).

"crontab," *FreeBSD General Commands Manual*, FreeBSD 2.2–Stable (on–line UNIX documentation).

*Primary Examiner*—Majid A. Banankhah
*Attorney, Agent, or Firm*—James D. Ivey

[57] ABSTRACT

A task scheduling computer program retrieved from a server computer system through a computer network and executed by a client computer system which can be a network computer having no persistent, writeable storage. In executing the task scheduling computer program, a collection of one or more execution schedules are retrieved. The collection of execution schedules can be retrieved from the client computer system, from the server computer system, or from another computer system coupled to the client computer system through the computer network. The collection can be uniquely identified within the computer network by a universal resource locator (URL). Each execution schedule of the collection specifies one or more execution times and a task to be performed by the client computer system at the one or more execution times. For each of the one or more execution schedules, the client computer system performs the specified task at the one or more execution times. The execution times can be specified in the same manner in which a conventional crontab file specifies one or more times at which a specified command is executed using the conventional cron mechanism of the known UNIX operating system. Each execution schedule of the collection specifies a respective task to be performed at the specified execution times by identifying the task and specifying zero or more alphanumeric arguments to be supplied to the identified task as input data.

30 Claims, 8 Drawing Sheets

DISTRIBUTED COMPUTER PROCESS SCHEDULING MECHANISM

FIELD OF THE INVENTION

The present invention relates to computer process scheduling and, in particular, to a mechanism for scheduling distributed computer processes.

BACKGROUND OF THE INVENTION

The known cron utility of the known UNIX operating system allows computer processes to be started and executed at times scheduled using the known crontab utility of the UNIX operating system. Accordingly, a user can configure a computer system which operates using the UNIX operating system to execute computer processes at a time when processing resources of the computer system would ordinarily be idle. Thus, the processing resource requirements of such computer processes can easily be met during off peak hours, and such computer processes do not compete for processing resources during busy, peak use times.

The ability to shift processing times of certain computer processes from busy, peak use times to off peak times is important for efficient allocation of processing resources. Some large computer processes require substantial processing resources to perform important computer processing functions. For example, backing up a computer system's persistent storage, e.g., mass storage media such as magnetic and/or optical storage media, requires substantial processing resources. Other examples of large computer processes which require substantial processing resources include complex system modeling in scientific research, complex signal processing particularly large collections of digital signals such as filtering seismic surveys for petroleum exploration, and generation of complex three-dimensional graphical images in computer generation of animated images.

Executing such large computer processes during regular business hours reduces the amount of computer processing resources available for processes executed by users of the computer system during the day to do the day's work. In addition, since such large computer processes compete with other processes during business hours, such large computer processes take longer to complete. By scheduling large computer processes for execution during off-peak hours, e.g., at night and on weekends, computer processes executed by users during the day to perform the day's work execute more quickly and increase productivity during business hours. In addition, the large computer processes execute with less competition for processing resources and therefore execute more quickly during off-peak hours.

Scheduling automated execution of computer processes has another advantage, namely, a user can configure the computer system to run time sensitive computer process at specific times. For example, a user can configure a computer process which updates a particular database to execute every hour during peak usage hours such that the database is always stores information which is current within one hour. Similarly, a user can configure a computer process to save and store backup copies of work in progress periodically, e.g., every ten minutes.

Passive terminals which connect users to a multi-user computer system are currently being replaced with network computers. A network computer (NC) is a fully-functioning computer system without permanent storage and which is connected to a server computer system through a computer network. A network computer executes a computer process by first downloading the computer instructions of the computer process from the server computer system and then executes the computer process as if the computer process was loaded from permanent storage which is local to the network computer. Network computers allow processing to be distributed to individual workers' desktops while data are kept in a centralized database on the server computer system. However, during off-peak time when users are not using the network computers, each network computer on a particular network represents additional unused computer processing resources. The cron and crontab utilities described above provide no mechanism by which such network computers can schedule and execute computer processes during off-peak hours or at any scheduled time to achieve the benefits of such scheduling described above.

What is needed is a mechanism by which a network computer can schedule automatic execution of computer processes which reside on a server computer system.

SUMMARY OF THE INVENTION

In accordance with the present invention, a task scheduling computer program retrieved from a server computer system through a computer network and executed by a client computer system which can be a network computer having no persistent, writeable storage. In executing the task scheduling computer program, a collection of one or more execution schedules are retrieved. The collection of execution schedules can be retrieved from the client computer system, from the server computer system, or from another computer system coupled to the client computer system through the computer network. The collection can be uniquely identified within the computer network by a universal resource locator (URL).

Each execution schedule of the collection specifies one or more execution times and a task to be performed by the client computer system at the one or more execution times. For each of the one or more execution schedules, the client computer system performs the specified task at the one or more execution times. The execution times can be specified in the same manner in which a conventional crontab file specifies one or more times at which a specified command is executed using the conventional cron mechanism of the known UNIX operating system.

Each execution schedule of the collection specifies a respective task to be performed at the specified execution times by identifying the task and specifying zero or more alphanumeric arguments to be supplied to the identified task as input data. The task is identified by an alphanumeric identifier of a class in an object oriented processing environment such as the processing environment of the Java™ programming language. To perform the task, an instance of the identified task is created in the client computer system and the specified arguments are supplied to a run( ) procedure of the newly created instance. Execution of the run( ) procedure of the newly created instance is invoked to cause the task specified collectively by the class identifier and the arguments to be performed by the client computer system. An interface of the run( ) procedure is defined by an abstract class such that the specific syntax by which the run( ) procedure is invoked is fixed regardless of the particular implementation of the run( ) procedure provided by the identified class, which is a subclass of the abstract class. Accordingly, invocation of the run( ) procedure can be entirely automated, i.e., does not require special adaptation of the scheduling computer program to anticipate a particular scheduled task.

Using a network-capable class definition retrieval mechanism such as that provided in the Java™ programming language allows the implementation of the run( ) procedure to be specified within any of a number of computer systems coupled to the computer network. Such provides a level of flexibility heretofore unseen in the art. Also contributing to the flexibility of scheduled computer processing in accordance with the present invention are the ability to retrieve the scheduling computer program from the server computer system and the ability to retrieve the collection of execution schedules from any computer system in the computer network. Accordingly, the processing capacity and resources of the client computer system are made available to the entire computer network for utilization to assist in completing automated tasks at predetermined scheduled times.

DETAILED DESCRIPTION

Figure 1:
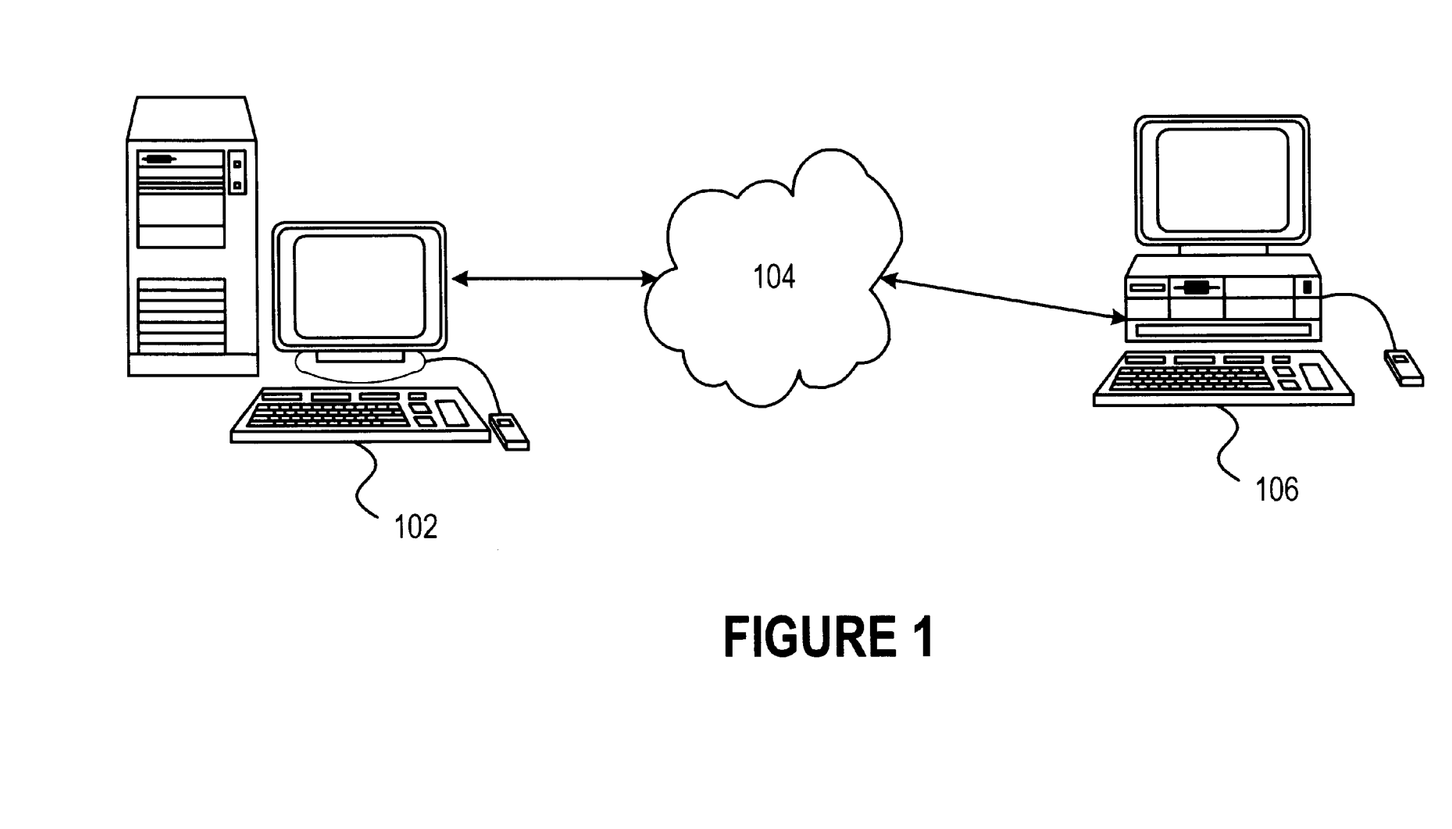
FIG. 1 is a block diagram of a server computer system and a client computer system coupled through a computer network.
Figure 2:
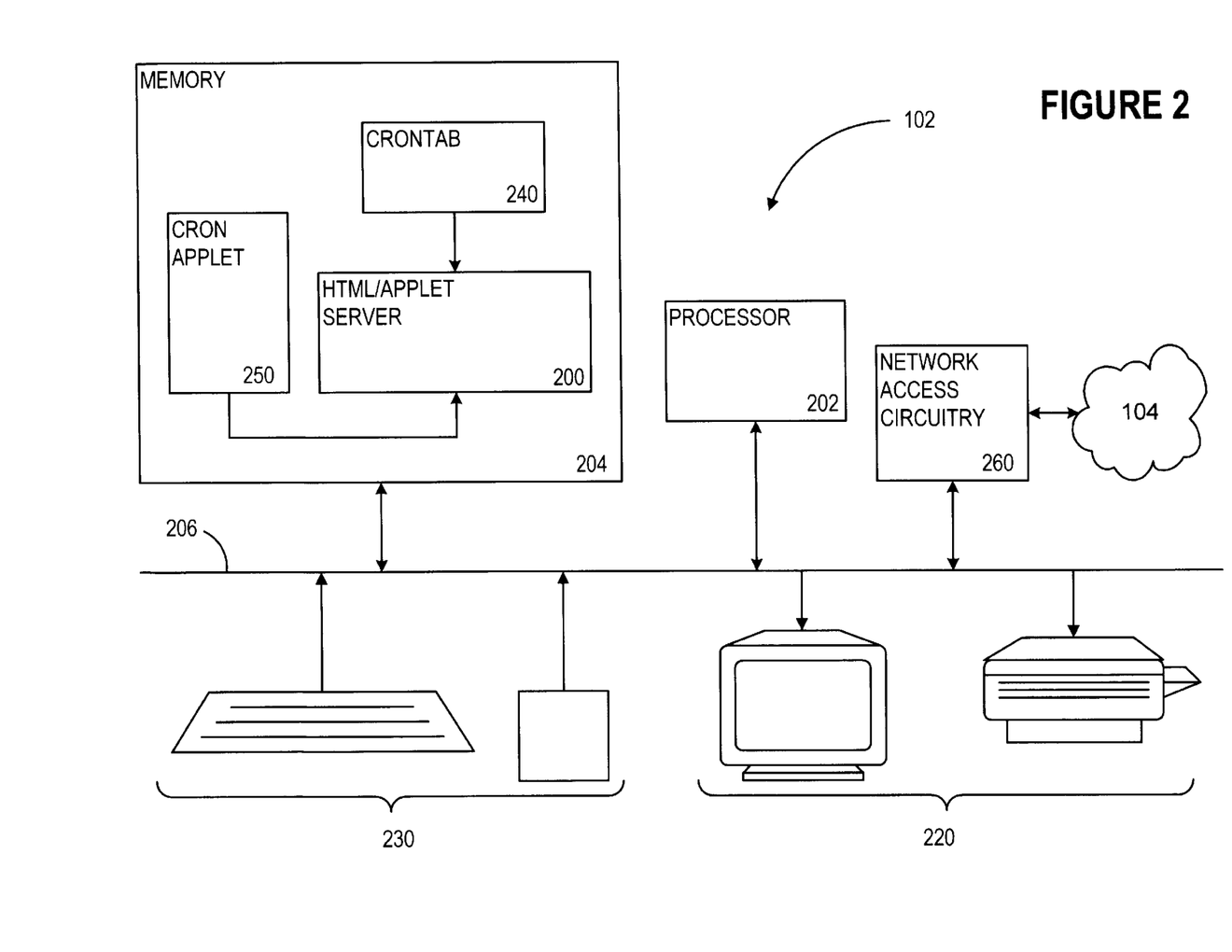
FIG. 2 is a block diagram of the server computer system of FIG. 1 in greater detail.
Figure 3:
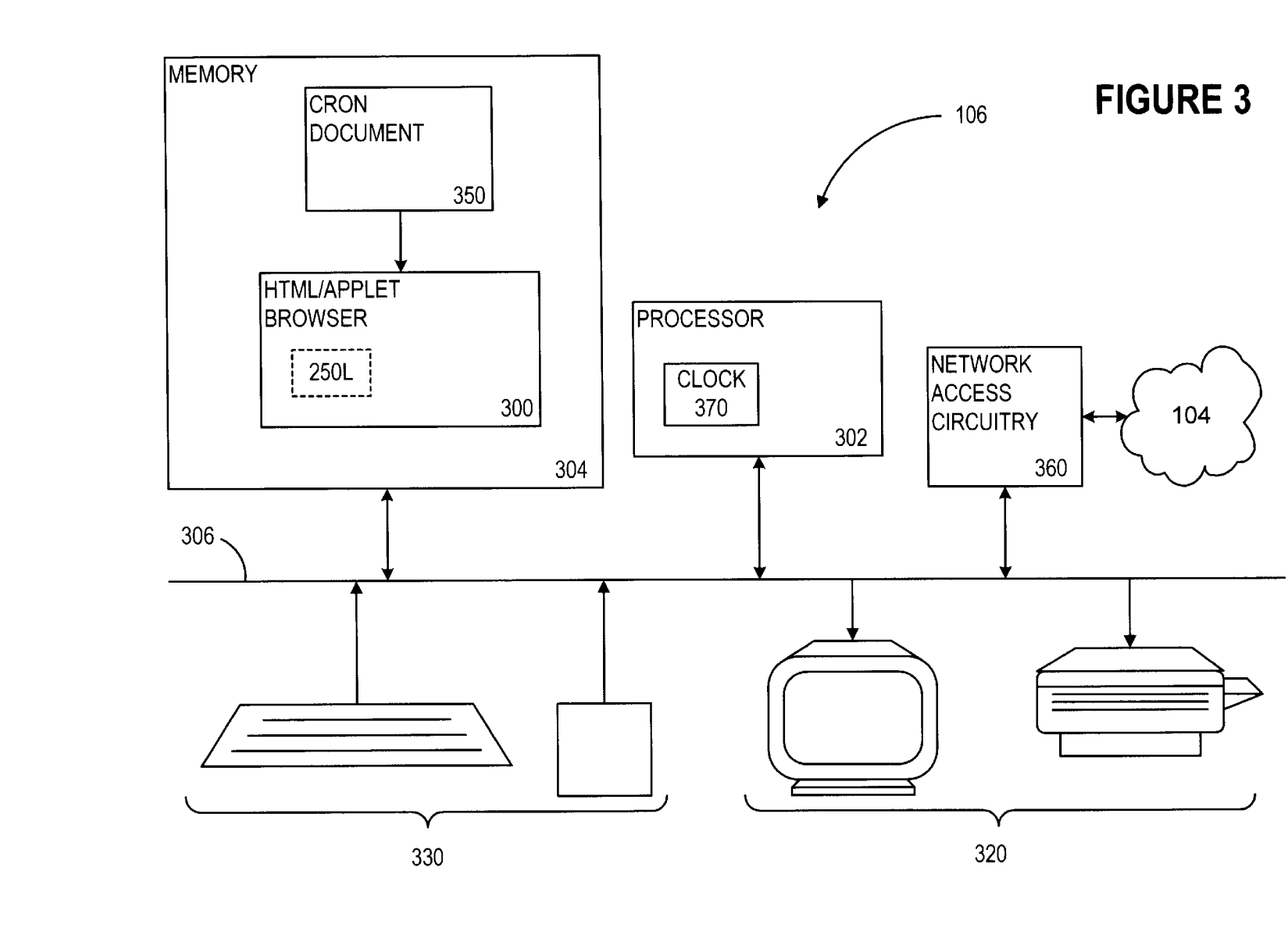
FIG. 3 is a block diagram of the client computer system of FIG. 1 in greater detail.

In accordance with the present invention, a client computer system 106 (FIG. 1) retrieves from a server computer system 102 through a network 104 a scheduling computer program in the form of a cron applet 250 (FIG. 2) and executes the scheduling computer program as represented by a local image 250L (FIG. 3). Execution of the scheduling computer program within client computer system 106 causes performance of tasks at specified execution times. Crontab file 240 (FIG. 2) in server computer system 102 includes a number of execution schedules, namely, crontab entries 502 (FIG. 5), each of which specifies a task and execution times at which the specified task is to be performed.

Operating Environment

To facilitate appreciation of the present invention, the operating environment of the present invention is briefly described. A server computer system 102 (FIG. 1) is coupled to a client computer system 106 through a network 104. In one embodiment, network 104 is the Internet. In an alternative embodiment, network 104 is an Intranet which supports the TCP/IP network protocol. Server computer system 102 (FIG. 2) includes a processor 202 and a memory 204 which is coupled to processor 202 through an interconnect 206. Interconnect 206 can be generally any interconnect mechanism for computer system components and can be, e.g., a bus, a crossbar, a mesh, a torus, or a hypercube. Processor 202 fetches from memory 204 computer instructions and executes the fetched computer instructions. In addition, processor 202 can fetch computer instructions through a computer network 104 through network access circuitry 260 such as a modem or ethernet network access circuitry. Processor 202 also reads data from and writes data to memory 204 and sends data and control signals through interconnect 206 to one or more computer display devices 220 and receives data and control signals through interconnect 206 from one or more computer user input devices 230 in accordance with fetched and executed computer instructions.

Memory 204 can include any type of computer memory and can include, without limitation, randomly accessible memory (RAM), read-only memory (ROM), and storage devices which include storage media such as magnetic and/or optical disks. Memory 204 includes an HTML/Applet server 200, a crontab 240, and a cron applet 250. HTML/Applet server 200 is all or part of a computer process which in turn executes within processor 202 from memory 204. A computer process is generally a collection of computer instructions and data which collectively define a task performed by computer system 200.

Each of computer display devices 220 can be any type of computer display device including without limitation a printer, a cathode ray tube (CRT), a light-emitting diode (LED) display, or a liquid crystal display (LCD). Each of computer display devices 220 receives from processor 202 control signals and data and, in response to such control signals, displays the received data. Computer display devices 220, and the control thereof by processor 202, are conventional.

Each of user input devices 230 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 230 generates signals in response to physical manipulation by a user and transmits those signals through interconnect 206 to processor 202.

As described above, HTML/Applet server 200 executes within processor 202 from memory 204. Specifically, processor 202 fetches computer instructions from HTML/Applet server 200 and executes those computer instructions. Processor 202, in executing HTML/Applet server 200, receives data representing requests for HTML documents and/or applets through network 104 from client computer system 106 (FIG. 1) and sends to client computer system 106 the requested HTML documents and/or applets through network 104.

Client computer system 106 includes a processor 302 (FIG. 3), memory 304, interconnect 306, computer display devices 320, user input devices 330, and network access circuitry 360, which are analogous to processor 202 (FIG. 2), memory 204, interconnect 206, computer display devices 220, user input devices 230, and network access circuitry 260, respectively, of server computer system 102. Memory 304, in one embodiment, contains very little persistent storage and relies on server computer system 102 for persistent storage of data and/or computer programs. HTML/Applet browser 300 (FIG. 3) is all or part of a computer process executing within processor 302 from memory 304. If client computer system 106 includes very little persistent storage in memory 304, HTML/Applet browser 300 is stored in whatever persistent storage there is in memory 304, which can include ROM and read-only optical storage media for example. HTML/Applet browser 300 receives signals generated by physical manipulation of user input devices 330 by a user and encodes requests for HTML documents and/or applets in accordance with the received signals. HTML/Applet browser 300 then sends the encoded requests through network 104 to HTML/Applet server 200 (FIG. 2). In response to the received request, HTML/Applet server 200 retrieves the requested HTML documents and/or applets which HTML/Applet server 200 sends through network 104 to HTML/Applet browser 300 (FIG. 3). HTML/Applet browser 300 receives the requested HTML documents and/or applets and displays any received HTML documents in one or more of computer display devices 320 for viewing by the user and executes any received applets.

An applet is a collection of computer instructions which can be retrieved through a computer network such as network 104 and executed to form a computer process. In one embodiment, applets requested and executed by HTML/Applet browser 300 conform to the Java™ programming language.

In one embodiment, processor 202 (FIG. 2) is the UltraSPARC processor available from Sun Microsystems, Inc. of Mountain View, California, and server computer system 102 is the UltraSPARCStation workstation computer system available from Sun Microsystems, Inc. of Mountain View, Calif. Java™, Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Client Initialization of the Cron Mechanism

Ordinarily, when client computer system 106 (FIG. 1) is not in use by a user, client computer system 106 sits idle or is powered off. However, in accordance with the present invention, a user of client computer system 106 can configure client computer system 106 to schedule automatic retrieval and execution of one or more applets from server computer system 102 and to effect such automatic applet retrieval and execution when scheduled. Specifically, the user of client computer system 106 (FIG. 3) directs HTML/Applet browser 300 to retrieve and view a cron document 350 by physical manipulation of one or more of user input devices 330 using conventional user-interface techniques. While cron document 350 is shown to reside in memory 304 of client computer system 106, it is appreciated that cron document 350 can reside in memory 204 (FIG. 2) of server computer system 102 or, in general, in any computer system from which HTML/Applet browser 300 (FIG. 3) can retrieve and view HTML documents through network 104.

Figure 4:
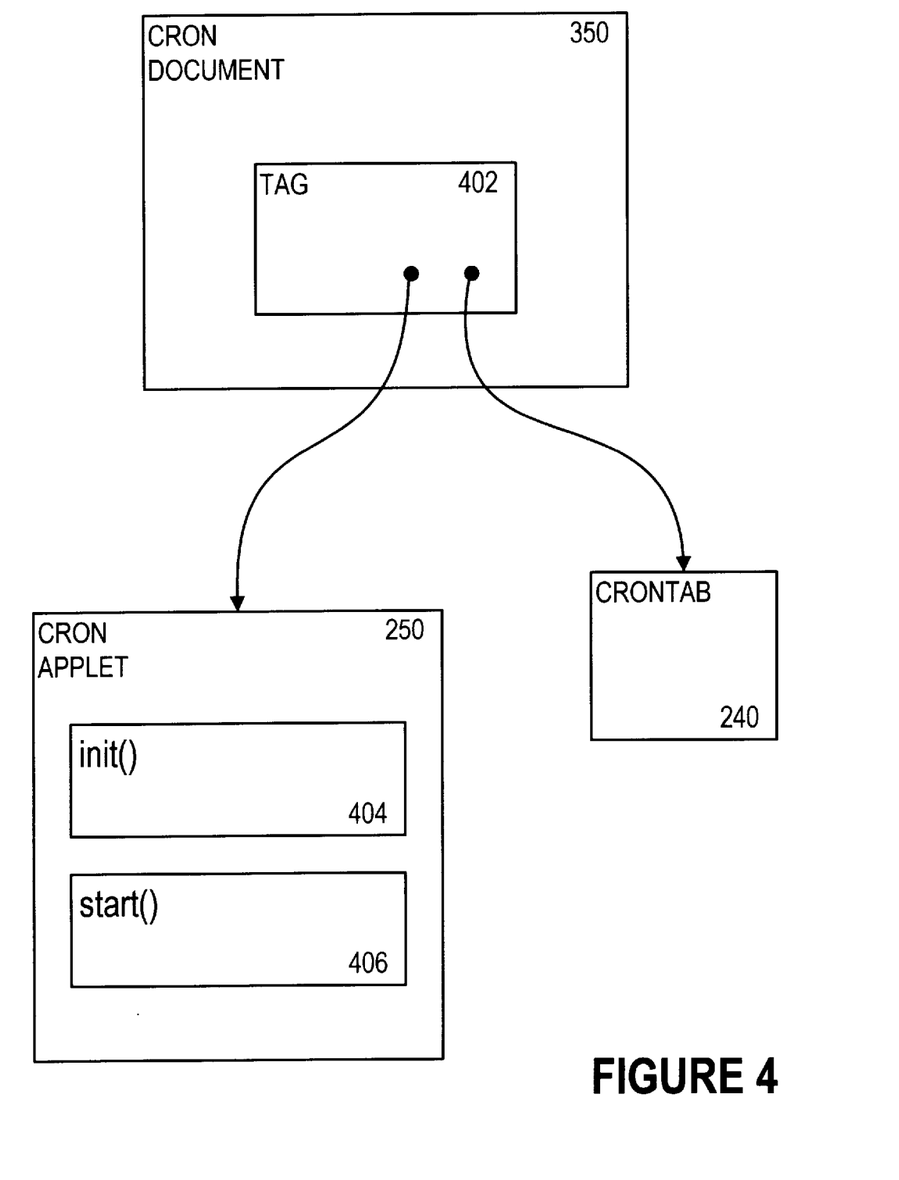
FIG. 4 is a block diagram illustrating relationships between a cron document of the client computer system of FIG. 3 and a cron applet and crontab file of the server computer system of FIG. 2.

Cron document 350 is shown in greater detail in FIG. 4. Cron document 350 is an HTML document and includes a tag 402 which invokes execution of a cron applet 250 and supplying a crontab file 240 as input data to cron applet 250. The following HTML tag is an illustrative example of tag 402 of cron document 350.

<applet code=CronApplet.class width=320 height=300> (1)

<param name=cron.crontab value=file:/server/applications/cron/crontab>

<param name=name value=Cron>

</applet>

In HTML tag (1), "code=CronApplet.class" identifies cron applet 250 as the applet invoked by HTML tag (1), and therefore tag 402, and "param name=cron.crontab value=file:/server/applications/cron/crontab" identifies crontab file 240 as input data to cron applet 250. By initiating retrieval and viewing of cron document 350 using HTML/Applet browser 300 (FIG. 3), the user causes HTML/Applet browser 300 to retrieve and execute cron applet 250 (FIG. 2) using crontab file 240 for input data. Thus, while cron applet 250 is stored in memory 204 of server computer system 102, cron applet 250 executes in processor 302 (FIG. 3) of client computer system 106. In particular, HTML/Applet browser 300 (i) directs processor 302 to retrieve the constituent computer instructions of cron applet 250, (ii) translates the retrieved computer instructions to a native format which processor 302 is capable of processing, and (iii) directs processor 302 to execute the translated instructions.

To illustrate the local execution of cron applet 250 (FIG. 2) within HTML/Applet browser 300 (FIG. 3) of client computer system 106, HTML/Applet browser 300 is shown in include a local image 250L of cron applet 250 (FIG. 2) which, in one embodiment, executes as a thread of HTML/Applet browser 300 (FIG. 3). Local image 250L can include all or only a portion of the computer instructions of cron applet 250 (FIG. 2). In general, HTML/Applet browser 300 (FIG. 3) retrieves only those computer instructions of cron applet 250 (FIG. 2) which are required for execution of cron applet 250, and HTML/Applet browser 300 (FIG. 3) causes received instructions to be executed within process 302 as they are received, i.e., while receipt of subsequent computer instructions of cron applet 250 (FIG. 2) is pending. Since all computer instructions of cron applet 250 can be retrieved and executed by HTML/Applet browser 300 (FIG. 3), local image 250L represents a logical presence of the entirety of cron applet 250 within HTML/Applet browser 300 (FIG. 3).

While it is shown that cron applet 250 is executed by HTML/Applet browser 300, it is appreciated that cron applet 250 can be executed by any virtual machine which is capable of executing an applet. Such virtual machines can be separate, independent computer processes which execute within client computer system 106 (FIG. 3) and which are dedicated to execution of applets stored within memory 304 or received through network 104. In addition, in embodiments in which memory 304 includes ample persistent storage, cron applet 250 can be permanently stored in memory 304 and can be compiled into a native computer instruction set designed specifically for execution by processor 302. In such embodiments, HTML/Applet browser 300 is superfluous and cron applet 250 (shown in FIG. 2) is stored in memory 304 (FIG. 3) and executes directly from memory 304 in processor 302. Accordingly, local image 205L is accurately representative of such a compiled embodiment of cron applet 250 (FIG. 2).

In accordance with the convention of applets which conform with the Java™ programming language, cron applet 250 (FIG. 4), and thus local image 250L (FIG. 3), includes an init( ) procedure 404 (FIG. 4) and a start( ) procedure 406. When HTML/Applet browser 300 (FIG. 3) retrieves cron applet 250 for the first time, HTML/Applet browser 300 executes init( ) procedure 404 (FIG. 4). Each time HTML/Applet browser 300 (FIG. 3) retrieves cron applet 250 (FIG. 4), including the first time, HTML/Applet browser 300 (FIG. 3) executes start( ) procedure 406. In executing init( ) procedure 404, HTML/Applet browser 300 retrieves a number of crontab entries 502 (FIG. 5) from crontab file 240.

Figure 5:
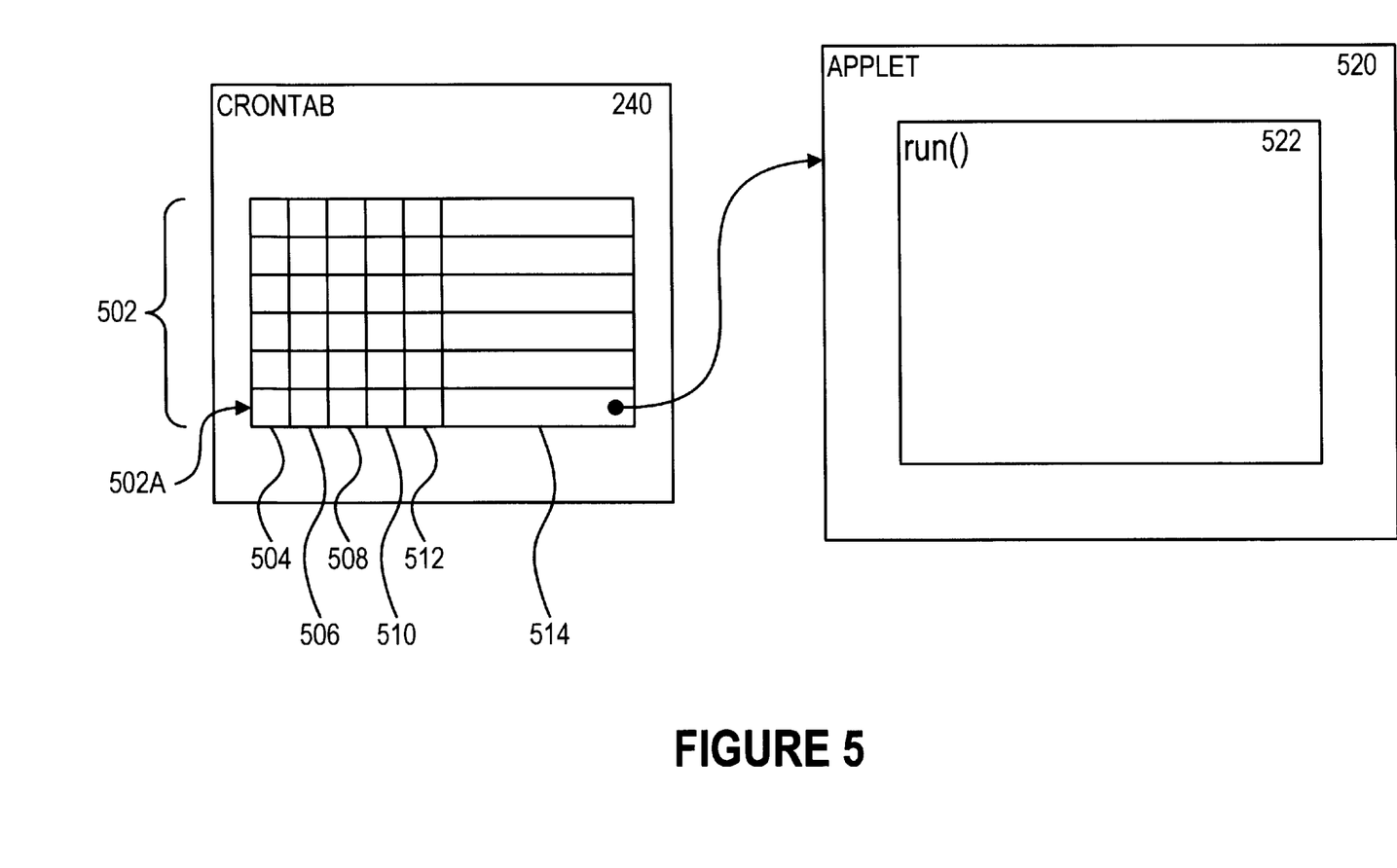
FIG. 5 is a block diagram of execution schedules of the crontab file of FIG. 4 in the form of crontab entries and an applet specified by one of the crontab entries.

Each of crontab entries 502 are directly analogous to one another. Accordingly, the following description of crontab entry 502A is equally applicable to any other of crontab entries 502. In one embodiment, crontab entries 502 have the same syntax as crontab entries in the conventional crontab utility of the UNIX operating system. While that syntax is known, that exemplary syntax is described here briefly for completeness. Crontab entry 502A includes a number of fields 504–514. A field is a collection of data which collectively represent a single piece of information. Fields 504–512 are numeric fields and each specifies a subset of a set of integer numeric values. In one embodiment, each of fields 504–512 can include one or more ranges of numerical values separated by commas or can include an asterisk, i.e. "*", to indicate all possible numerical values. A range which has only one numerical value is represented by the numerical value itself, and a range which has more than one numerical value is represented by the lower and upper range limits delimited by a hyphen. The following are illustrative examples. "1" indicates that only the numerical value of one is specified. "5–10" indicates that all integer values not less than five and not more than ten are specified. "1,5–10" indicates that the numerical value of one and all integer values not less than five and not more than ten are specified.

Minute field 504 specifies minute values which range from 0 to 59. Hour field 506 specifies hour values which range from 0 to 23. Day of month field 508 specifies day values which range from 1 to 31. Month field 510 specifies month values which range from 1 to 12, wherein a value of one represents January, a value of two represents February, and so forth. Day of week field 512 specifies day of the week values which range from 1 to 7, wherein a value of one represents Sunday, a value of two represents Monday, a value of three represents Tuesday, a value of four represents Wednesday, a value of five represents Thursday, a value of six represents Friday, and a value of seven represents Saturday. In this illustrative embodiment, fields 504–512 are delimited by spaces and/or tabs. The following table provides some illustrative examples of specific values of fields 504–512 and the corresponding meanings of the respective examples.

TABLE A

| Fields 504–512 | Times Specified |
| --- | --- |
| 30 1 23 12 * | At 1:30 am on December 23 regardless of the day of week. |
| 0 0–23 * * * | At the top of every hour on every day. |
| 0 12,16 * * 6 | At 12:00 noon and 4:00 pm every Friday. |
| * * 10 7 2 | At every minute on Monday, July 10. |

Thus, fields 504–512 specify execution times with a precision of one minute. However, it is appreciated that execution times can be specified with any of a number of syntaxes and chronological precision can be more coarse or more fine that one-minute increments.

Applet field 514 specifies an applet to be executed at the time(s) specified in fields 504–512 and zero or more arguments to be accepted by the specified applet as input data. In this illustrative example, applet field 514 includes alphanumeric data components which are delimited by one or more spaces and/or tab characters in which the first alphanumeric component identifies the specified applet and any subsequent alphanumeric components are provided to the specified applets and respective alphanumeric arguments. For example, if applet field 514 stores the alphanumeric characters "autoApplet arg1 arg2 arg3," the characters "autoApplet" specify an applet with a name of "autoApplet" as the applet to be executed at the one or more times specified in fields 504–512, and the characters "arg1," "arg2," and "arg3" are submitted to the applet named "autoApplet" as three alphanumeric arguments.

Figure 6:
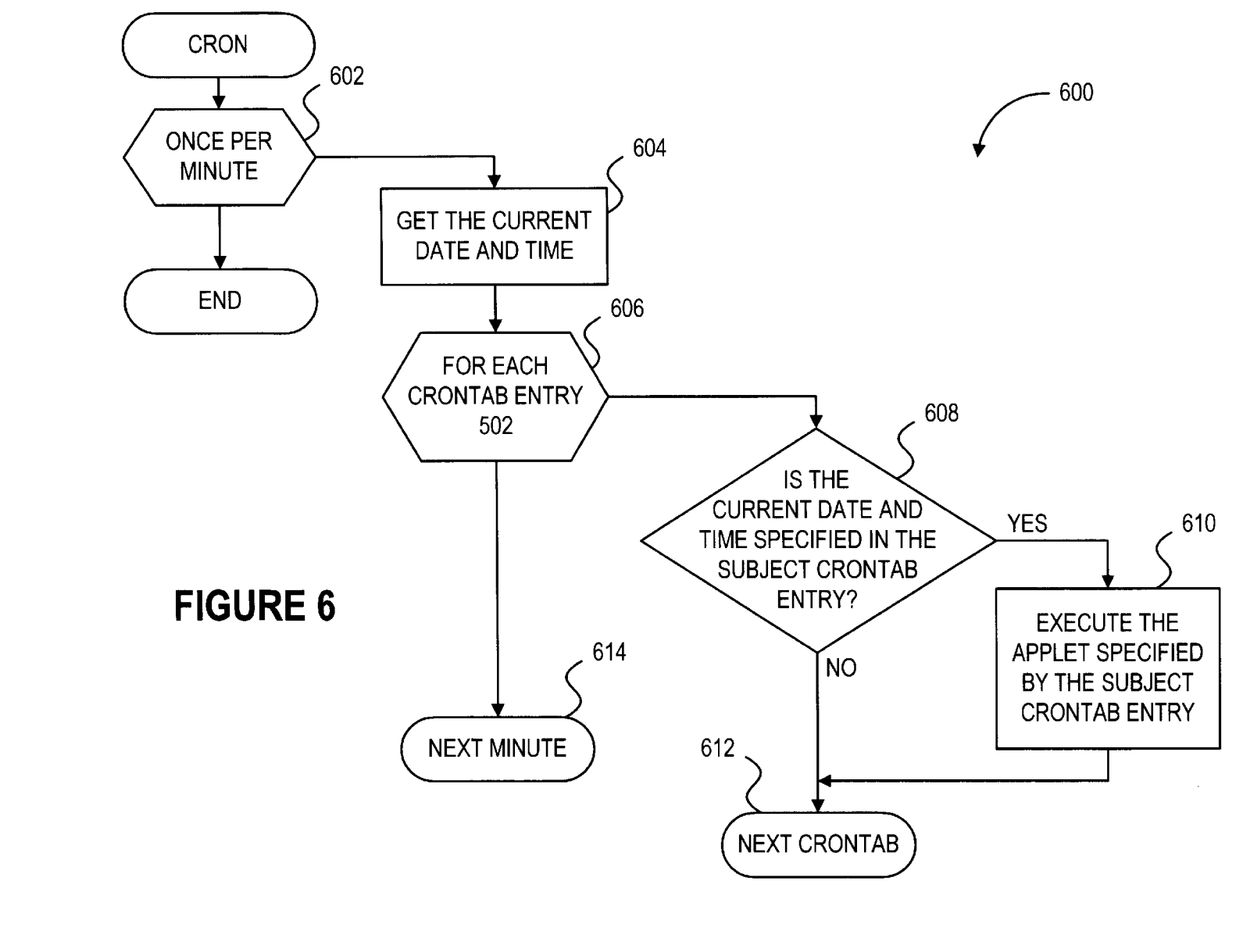
FIG. 6 is a logic flow diagram of the processing of the cron applet of FIG. 4 within the client computer system of FIG. 3.

Thus, execution of init( ) procedure 406 (FIG. 4) reads crontab entries 502 (FIG. 5) from crontab file 240 and parses crontab entries 502. In viewing cron document 350 (FIG. 3), HTML/Applet browser 300 invokes start( ) procedure 406 (FIG. 4) of cron applet 250. Processing of start( ) procedure 406 is illustrated in logic flow diagram 600 (FIG. 6).

Processing according to logic flow diagram 600 begins in loop step 602 which, in conjunction with next step 614, defines a loop in which start( ) procedure 406 (FIG. 4) performs steps 604–612 every minute as measured in a system clock 370 (FIG. 3). Each minute, processing transfers from loop step 602 (FIG. 6) to step 604. In step 604, start( ) procedure 406 (FIG. 4) gets the current date and time from system clock 370 (FIG. 3). Processing transfers to loop step 606 (FIG. 6).

Loop step 606 and next step 612 define a loop in which start( ) procedure 406 (FIG. 4) processes each of crontab entries 502 (FIG. 5) retrieved from crontab file 240. For each of crontab entries 502, processing transfers from loop step 606 (FIG. 6) to test step 608. During each iteration of the loop defined by loop step 606 and next step 612, the particular one of crontab entries 502 (FIG. 5) processed by start( ) procedure 406 (FIG. 4) is referred to as the subject crontab entry. In test step 608 (FIG. 6), start( ) procedure 406 (FIG. 4) determines whether the current date and time is specified by the subject crontab entry as a time as which the applet specified by the subject crontab entry is scheduled for execution. For example, if crontab entry 502A (FIG. 5) is the subject crontab entry, start( ) procedure 406 (FIG. 4) of cron applet 250 compares the minute, hour, day of month, month, and day of week of the current date and time retrieved in step 604 (FIG. 6) with values specified by minute field 504 (FIG. 5), hour field 506, day of month field 508, month field 510, and day of week field 512, respectively.

If all of fields 504–512 collectively include the current date and time, processing transfers from test step 608 (FIG. 6) to step 610 in which start( ) procedure 406 (FIG. 4) invokes execution of the applet specified in applet field 514 (FIG. 5), which is sometimes referred to herein as the target applet, while supplying any arguments to the target applet. The target applet executes in processor 302 (FIG. 3) from memory 204 (FIG. 2) through network 104 in a manner which is directly analogous to that described above with respect to execution of cron applet 250 in processor 302 (FIG. 3). The manner in which start( ) procedure 406 invokes execution of the target applet is described in greater detail below. After step 610 (FIG. 6), processing transfers through next step 612 to loop step 606 in which the next of crontab entries 502 (FIG. 5) is processed by start( ) procedure 406 (FIG. 4) in the manner described above. In addition, if any of fields 504–512 does not include the respective component of the current date and time as retrieved in step 604, processing transfers from test step 606 through next step 612 to loop step 606 and step 610 is bypassed for the subject crontab entry.

Once all of crontab entries 502 (FIG. 5) have been processed according to the loop of steps 606 (FIG. 6) and 612, processing transfers through next step 614 to loop step 602 in which start( ) procedure 406 (FIG. 4) sits idle for approximately one minute and again transfers to step 604 (FIG. 6). In this way, start( ) procedure 406 (FIG. 4) checks every minute to determine whether any applet specified by a crontab entry should be started at that particular minute and, if so, starts the specified applet.

Execution of the Scheduled Applet

As described above with respect to step 610 (FIG. 6), start( ) procedure 404 (FIG. 4) of cron applet 250 invokes execution of the target applet, i.e., applet 520 (FIG. 5), at the times specified in fields 504–512. In an illustrative embodiment of the present invention, applets are constructed of computer instructions which comport with the Java™ programming language which is object oriented. Object oriented computer programming languages, and the Java™ programming language in particular, are well known. In this embodiment applet 520 is an instance of an applet class 706 (FIG. 7), which is a subclass of an Executable class 702. Executable class 702 defines an interface for a run( ) procedure, i.e., run( ) interface 704. Interfaces are well known components of object oriented programming languages and the Java™ programming language in particular. Briefly, an interface defines the syntax by which a procedure is invoked.

Figure 7:
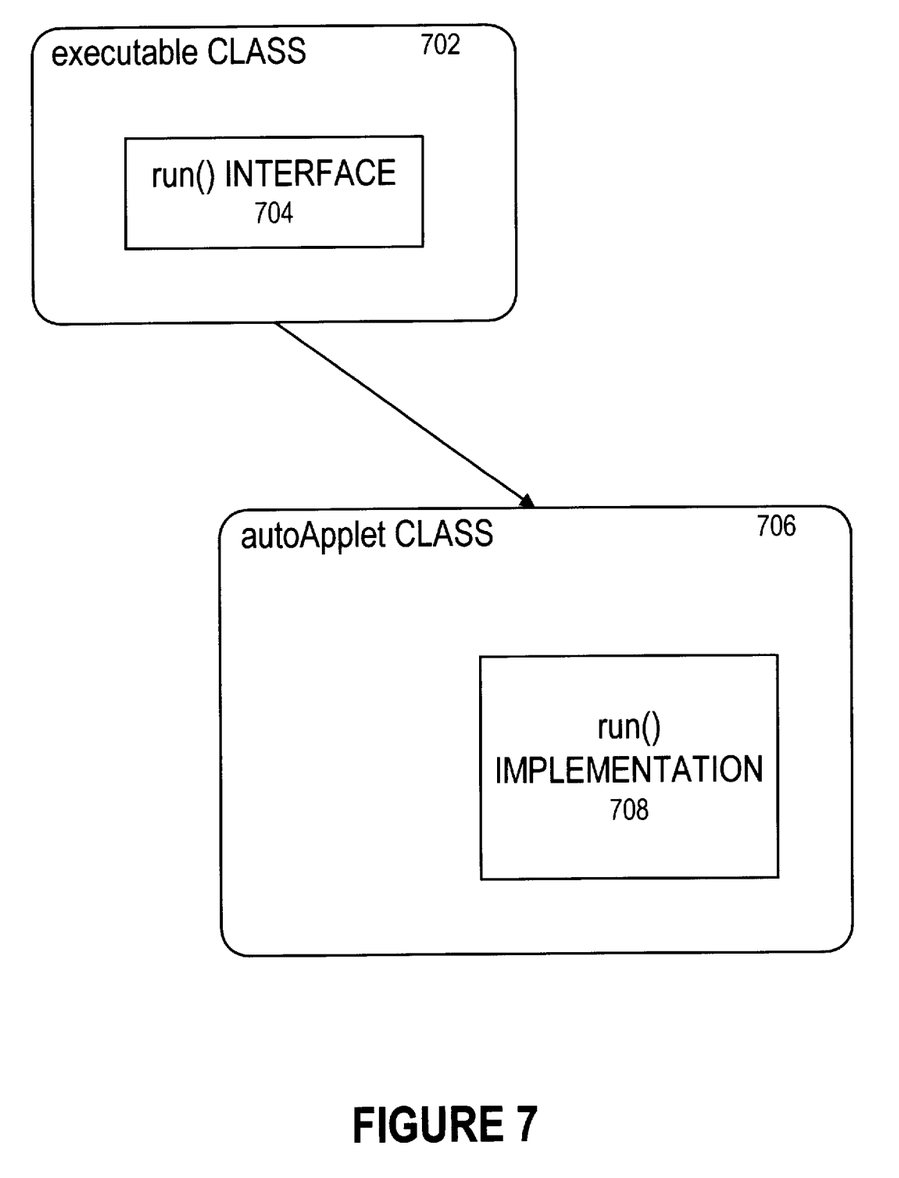
FIG. 7 is a block diagram illustrating class relationships between an abstract class defining an interface of a run( ) procedure and an autoApplet class defining an implementation of the run( ) procedure.

Executable class 702 is abstract. In particular, executable class 702 defines run( ) interface 704 but does not define any implementation of the run( ) procedure. Implementations are well known components of object oriented programming languages and the Java™ programming language in particular. Briefly, an implementation of a procedure specifies the computer instructions which are executed in response to invocation of the procedure and therefore defines the behavior of the procedure when executed. However, each object which performs the procedure does so in the context of the specific state of the object and different results can be produced by performance of the same procedure by objects having different states.

AutoApplet class 706 is a subclass of executable class 702 and therefore inherits the interface of the run( ) procedure defined by run( ) interface 704 and includes run( ) implementation 708 which defines an implementation of the run( ) procedure. Runo implementation 708 specifies computer instructions which are executed when the run( ) procedure of an instance of autoApplet class 706 is executed. In designing autoApplet 520 (FIG. 5), a software engineer can include in run( ) implementation 708 (FIG. 7) whatever computer instructions are appropriate to achieve a desired result. In this respect, the software engineer has significant discretion to design into autoApplet 520 (FIG. 5) any of a wide variety of functions, behaviors, and capabilities.

Figure 8:
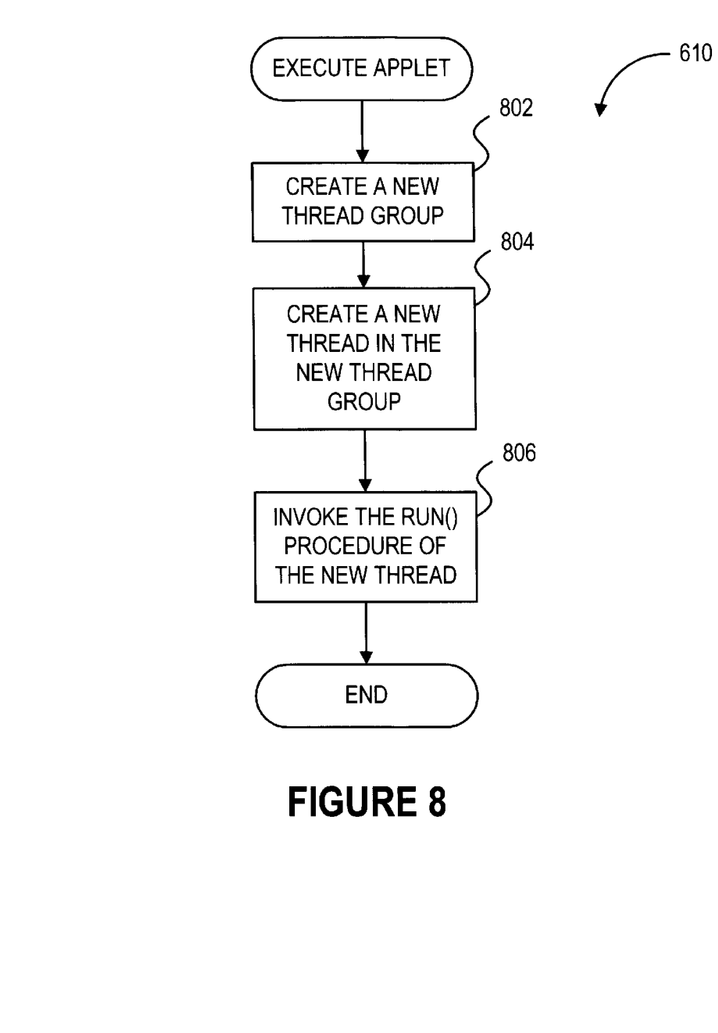
FIG. 8 is a logic flow diagram illustrating invocation of the applet of FIG. 5.

The execution of applet 520 by local image 250L (FIG. 3) in step 610 (FIG. 6) is illustrated by logic flow diagram 610 (FIG. 8) in which processing begins in step 802. In step 802, local image 250L (FIG. 3) creates a new thread group. The Java™ programming language is multi-threaded, i.e., applets can have multiple execution states simultaneously. Each thread has a separate execution state an executes concurrently with other threads of the same computer process. Local image 250L (FIG. 3) can be implemented as one or more threads of HTML/Applet browser 300. In addition, the Java™ programming language allows threads to be grouped into thread groups. Threads of each group are not permitted to interfere with threads of another group. Since local image 250L is uncertain regarding the particular behavior of procedure run( ) 522 (FIG. 5) of applet 520 when executed, local image 250L (FIG. 3) creates a new thread group within which procedure run( ) 522 (FIG. 5) can execute without interfering with any other threads of local image 250L (FIG. 3). Processing transfers to step 804 (FIG. 8).

In step 804, local image 250L (FIG. 3) creates a new thread within the thread group created in step 802 (FIG. 8) and within which to execute applet 520 (FIG. 5). Processing transfers to step 806 (FIG. 8) in which local image 250L (FIG. 3) invokes run( ) procedure 522 (FIG. 5) of applet 520. Step 806 (FIG. 8) is shown in greater detail as logic flow diagram 806 (FIG. 9).

Figure 9:
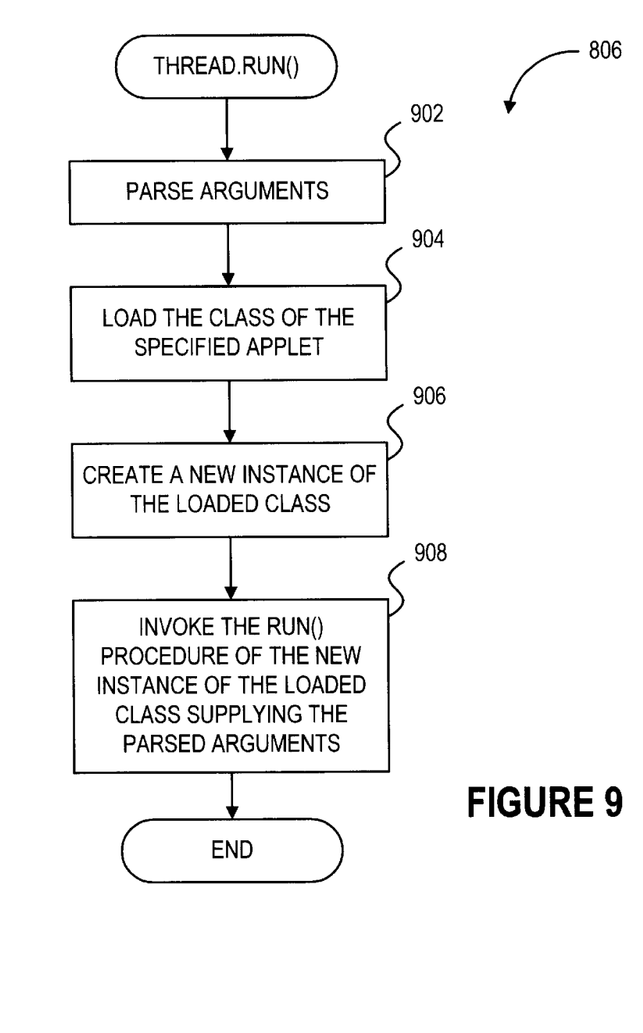
FIG. 9 is a logic flow diagram illustrating a step of the logic flow diagram of FIG. 8 in greater detail.

Processing according to logic flow diagram 806 begins in step 902 in which local image 250L (FIG. 3) parses the arguments specified in applet field 514 (FIG. 5). Continuing in the example given above in which applet field 514 stores the alphanumeric characters "autoApplet arg1 arg2 arg3," local image 250L (FIG. 3) parses the arguments "arg1," "arg2," and "arg3" into respective elements of an array of alphanumeric string data variables.

Processing transfers to step 904 (FIG. 9) in which local image 250L (FIG. 3) loads the class specified by applet field 514 (FIG. 5), e.g., the class specified by the alphanumeric characters "autoApplet." In this illustrative example, "autoApplet" specifies autoApplet class 706 (FIG. 7). Loading of autoApplet class 706 by local image 250L (FIG. 3) includes retrieving data defining autoApplet class 706 (FIG. 7) from HTML/Applet browser 300 (FIG. 3), HTML/Applet server 200 (FIG. 2), or any other HTML/Applet server from which HTML/Applet browser 300 (FIG. 3) can retrieve class definitions through network 104. The loading of classes defined using the Java™ programming language is a known feature of the Java™ programming language and is not described herein further. However, it should be noted that data defining autoApplet class 706 (FIG. 7) can reside on practically any computer system coupled to network 104 (FIG. 3), thereby adding significant flexibility to the applet scheduling mechanism described herein.

In step 906 (FIG. 9), to which processing transfers, local image 250L (FIG. 3) creates a new instance of the class retrieved in step 904 (FIG. 9), e.g., autoApplet class 706 (FIG. 7). Creation of a new instance of a class defined using the Java™ programming language is a known feature of the Java™ programming language and is not described herein further. Specifically, local image 250L (FIG. 3) creates applet 520 (FIG. 5), which is an instance of autoApplet class 706 (FIG. 7), in step 906 (FIG. 9). It should be noted that local image 250L (FIG. 3), and other local images of cron applet 250 (FIG. 2) executing within HTML/Applet browser 300 (FIG. 3) can create other instances of autoApplet class 706 (FIG. 7), each of which has a separate context and execution state and each of which can execute independently of one another.

Since applet 520 (FIG. 5) is an instance of autoApplet class 706 (FIG. 7), applet 520 (FIG. 5) includes run( ) procedure 522 with a behavior defined by run( ) implementation 708 (FIG. 7) of autoApplet class 706 and with an invocation syntax defined by run( ) interface 704 of executable class 702. In this illustrative embodiment, run( ) interface 704 specifies that run( ) procedure 522 (FIG. 5) accepts as input data an array of alphanumeric strings. In step 908 (FIG. 9), local image 250L (FIG. 3) invokes run( ) procedure 522 (FIG. 5) supplying as input data the arguments parsed in step 902 (FIG. 9). Accordingly, run( ) procedure 522 (FIG. 5) executes within HTML/Applet browser 300 (FIG. 3) as a new thread created in step 804 (FIG. 8) in the new thread group created in step 802.

Thus, by inclusion of alphanumeric data specifying autoApplet class 706 (FIG. 7) in applet field 514 (FIG. 5) of crontab entry 502A, client computer system 106 (FIG. 3) can be configured to automatically execute run( ) procedure 522 (FIG. 5) at whatever times are specified by fields 504–512. Accordingly, processing resources of client computer system 106 (FIG. 3) can be used during off-peak hours when client computer system 106 is not in use by a human user. This is so even if client computer system 106 has very little persistent storage and looks primarily to network 104 for computer instructions to execute and data to process. In addition, flexibility in the particular applets specified in crontab entries 502 (FIG. 5) and in the particular configuration of run( ) implementation 708 (FIG. 7) provide wide latitude in the particular tasks which client computer system 106 (FIG. 3) can perform automatically at scheduled times. For example, HTML/Applet browser 300 can be configured to look to HTML/Applet server 200 (FIG. 2) for specification as to precisely which tasks are performed at which times, and HTML/Applet server 200 can divide particularly large and complex tasks into smaller tasks and assign those smaller tasks to multiple client computer systems to thereby distribute a large, complex task among many client computer systems. Accordingly, a multitude of client computer systems coupled to one or more servers become a large, available reserve of processing resources which have significant processing capacity surplus during night and weekend hours.

The above description is illustrative only and is not limiting. The present invention is limited only by the claims which follow.

What is claimed is:

1. In a client computer network system, said computer network comprising at least one or more client computer systems, a task schedule computer system, and a server computer system;

wherein at least one of said client computer systems has no permanent storage and requests and receives its executable processes from said server computer system, and wherein tasks may be distributed over a plurality of said client computer systems, a method for performing one or more scheduled tasks in a client computer network system, the method comprising:

executing a scheduling computer program where such execution includes performance of the following steps:

retrieving one or more execution schedules from a task schedule computer system coupled to the client computer system through a computer network which couples the client computer system to a server computer system and to task schedule computer system, each execution schedule specifying one or more execution times and a task to be performed by the client computer system at each of the one or more execution times; and for each of the one or more execution schedules, performing the task specified by the execution schedule at the one or more execution times specified by the execution schedule.

2. The method of claim 1 further comprising performing the following steps prior to the step of executing:

requesting the scheduling computer program from the server computer system through the computer network; and receiving the scheduling computer program from the server computer system through the computer network.

3. The method of claim 1 wherein the task schedule computer system is the client computer system.

4. The method of claim 1 wherein the task schedule computer system is the server computer system.

5. The method of claim 1 wherein the task schedule computer system is a computer system other than the client computer system and the server computer system.

6. The method of claim 1 wherein each execution schedule specifies a task by specifying (i) a class of task and (ii) zero or more arguments to be used as input data during execution of an instance of the class of task.

7. The method of claim 6 wherein the class of task is a class of objects in an objected oriented processing environment.

8. The method of claim 7 wherein the class of task is a Java™ class.

9. The method of claim 7 wherein the class of task is a subclass of a second class and implements a procedure which has an interface defined in the second class; and further wherein the task of an execution schedule is performed by performing the following step:

invoking execution of the procedure by an instance of the class of task.

10. The method of claim 9 wherein the step of invoking includes supplying the zero or more arguments to the instance of the class of task.

11. In a client computer network system, said computer network comprising at least one or more client computer systems, a task schedule computer system and a server computer system;

wherein at least one of said client computer systems has no permanent storage and requests and receives its executable processes from said server computer system, and wherein tasks may be distributed over a plurality of said client computer systems, a computer readable medium useful in association with a computer which includes a processor and a memory, the computer readable medium including computer instructions which are configured to cause the computer to perform one or more scheduled tasks in a client computer network system by performing the steps of:

executing a scheduling computer program where such execution includes performance of the following steps:

retrieving one or more execution schedules from a task schedule computer system coupled to the client computer system through a computer network which couples the client computer system to a server computer system and to task schedule computer system, each execution schedule specifying one or more execution times and a task to be performed by the client computer system at each of the one or more execution times; and for each of the one or more execution schedules, performing the task specified by the execution schedule at the one or more execution times specified by the execution schedule.

12. The computer readable medium of claim 11 wherein the computer instructions are configured to cause the computer to perform the following steps prior to the step of executing:

requesting the scheduling computer program from the server computer system through the computer network; and receiving the scheduling computer program from the server computer system through the computer network.

13. The computer readable medium of claim 11 wherein the task schedule computer system is the client computer system.

14. The computer readable medium of claim 11 wherein the task schedule computer system is the server computer system.

15. The computer readable medium of claim 11 wherein the task schedule computer system is a computer system other than the client computer system and the server computer.

16. The computer readable medium of claim 11 wherein each execution schedule specifies a task by specifying (i) a class of task and (ii) zero or more arguments to be used as input data during execution of an instance of the class of task.

17. The computer readable medium of claim 16 wherein the class of task is a class of objects in an objected oriented processing environment.

18. The computer readable medium of claim 17 wherein the class of task is a Java™ class.

19. The computer readable medium of claim 17 wherein the class of task is a subclass of a second class and implements a procedure which has an interface defined in the second class; and further wherein the task of an execution schedule is performed by performing the following step:
invoking execution of the procedure by an instance of the class of task.

20. The computer readable medium of claim 19 wherein the step of invoking includes supplying the zero or more arguments to the instance of the class of task.

21. In a client computer network system, said computer network comprising at least one or more client computer systems, a task schedule computer system, and a server computer system;

wherein at least one of said client computer systems has no permanent storage and requests and receives its executable processes from said server computer system, and wherein tasks may be distributed over a plurality of said client computer systems a computer system comprising:
a processor;
a memory operatively coupled to the processor; and
a task scheduling process which executes in the processor from the memory and which, when executed by the processor, performs one or more scheduled tasks in a client computer network system by performing the steps of:
executing a scheduling computer program where such execution includes performance of the following steps:
retrieving one or more execution schedules from a task schedule computer system coupled to the client computer system through a computer network which couples the client computer system to a server computer system and to task schedule computer system, each execution schedule specifying one or more execution times and a task to be performed by the client computer system at each of the one or more execution times; and
for each of the one or more execution schedules, performing the task specified by the execution schedule at the one or more execution times specified by the execution schedule.

22. The computer readable medium of claim 21 wherein the task scheduling process further performs the following steps prior to the step of executing:
requesting the scheduling computer program from the server computer system through the computer network; and
receiving the scheduling computer program from the server computer system through the computer network.

23. The computer system of claim 21 wherein the task schedule computer system is the client computer system.

24. The computer system of claim 21 wherein the task schedule computer system is the server computer system.

25. The computer system of claim 21 wherein the task schedule computer system is a computer system other than the client computer system and the server computer system.

26. The computer system of claim 21 wherein each execution schedule specifies a task by specifying (i) a class of task and (ii) zero or more arguments to be used as input data during execution of an instance of the class of task.

27. The computer system of claim 26 wherein the class of task is a class of objects in an objected oriented processing environment.

28. The computer system of claim 27 wherein the class-of task is a Java™ class.

29. The computer system of claim 27 wherein the class of task is a subclass of a second class and implements a procedure which has an interface defined in the second class; and further wherein the task of an execution schedule is performed by performing the following step:
invoking execution of the procedure by an instance of the class of task.

30. The computer system of claim 29 wherein the step of invoking includes supplying the zero or more arguments to the instance of the class of task.

* * * * *